(12) United States Patent
Hsu et al.

(10) Patent No.: US 8,203,797 B2
(45) Date of Patent: Jun. 19, 2012

(54) PHOTOGRAPHING OPTICAL LENS ASSEMBLY

(75) Inventors: Po Lun Hsu, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 94 days.

(21) Appl. No.: 12/854,488

(22) Filed: Aug. 11, 2010

(65) Prior Publication Data
US 2011/0228410 A1 Sep. 22, 2011

(30) Foreign Application Priority Data
Mar. 19, 2010 (TW) .............................. 99108116 A

(51) Int. Cl.
*G02B 3/02* (2006.01)
*G02B 9/12* (2006.01)
(52) U.S. Cl. ....................... 359/716; 359/784
(58) Field of Classification Search .................. 359/716, 359/753, 784
See application file for complete search history.

(56) References Cited

U.S. PATENT DOCUMENTS

| 7,397,612 B2 | 7/2008 | Chen et al. |
| 7,515,351 B2 | 4/2009 | Chen et al. |
| 7,933,077 B1 * | 4/2011 | Tsai .............................. 359/753 |

FOREIGN PATENT DOCUMENTS
JP 2001272598 A 10/2001

* cited by examiner

*Primary Examiner* — William Choi
(74) *Attorney, Agent, or Firm* — Morris Manning & Martin LLP; Tim Tingkang Xia, Esq.

(57) ABSTRACT

This invention provides a photographing optical lens assembly from an object side toward an image side in order including a first lens element with negative refractive power having a concave image-side surface, a second lens element with positive refractive power having the object-side surface and the image-side surface being convex, a third lens element with negative refractive power having a concave image-side surface and both surfaces thereof being aspheric. An aperture stop is positioned between the first and the second lens elements. An electronic photo sensor is positioned at the image plane. There are three lens elements with refractive power in the photographing optical lens assembly.

20 Claims, 16 Drawing Sheets

| TABLE 1 | | | | | | | |
|---|---|---|---|---|---|---|---|
| (Embodiment 1) | | | | | | | |
| f = 1.14 mm, Fno = 2.43, HFOV = 57.2 deg. | | | | | | | |
| Surface # | | Curvature Radius | Thickness | Material | Index | Abbe # | Focal length |
| 0 | Object | Plano | Infinity | | | | |
| 1 | Lens 1 | 2.79506 (ASP) | 0.300 | Plastic | 1.544 | 55.9 | -1.87 |
| 2 | | 0.71868 (ASP) | 1.230 | | | | |
| 3 | Ape. Stop | Plano | 0.004 | | | | |
| 4 | Lens 2 | 1.09222 (ASP) | 1.087 | Plastic | 1.544 | 55.9 | 1.03 |
| 5 | | -0.75472 (ASP) | -0.156 | | | | |
| 6 | | Plano | 0.226 | | | | |
| 7 | Lens 3 | 2.14404 (ASP) | 0.300 | Plastic | 1.632 | 23.4 | -2.22 |
| 8 | | 0.80307 (ASP) | 0.200 | | | | |
| 9 | IR-filter | Plano | 0.200 | Glass | 1.517 | 64.2 | - |
| 10 | | Plano | 0.050 | | | | |
| 11 | Cover-glass | Plano | 0.400 | Glass | 1.517 | 64.2 | - |
| 12 | | Plano | 0.530 | | | | |
| 13 | Image | Plano | - | | | | |
| Note: A light limiting component placed on surface #6, its effective diameter is 1.00mm. | | | | | | | |

Fig. 5

| TABLE 2 | | | | | | |
|---|---|---|---|---|---|---|
| Aspheric Coefficients | | | | | | |
| Surface # | 1 | 2 | 4 | 5 | 7 | 8 |
| k = | -1.00000E+00 | -8.66203E-01 | -2.22726E+00 | 5.06466E-01 | -1.00000E+00 | -1.00000E+00 |
| A4 = | -2.72887E-02 | 1.00052E-01 | -1.77432E-01 | -7.07789E-01 | -2.78583E+00 | -1.98092E+00 |
| A6 = | -3.89073E-03 | 1.51233E-01 | 1.42829E+00 | 6.56840E+00 | 6.14221E+00 | 3.84395E+00 |
| A8 = | | 8.41638E-02 | -8.47185E+00 | -1.87020E+01 | -1.29516E+01 | -5.41782E+00 |
| A10= | | | -4.20167E+00 | 2.85833E+01 | 2.12738E+00 | 3.24437E+00 |
| A12= | | | | | 2.39158E-10 | |

Fig. 6

| TABLE 3 | | | | | | | |
|---|---|---|---|---|---|---|---|
| (Embodiment 2) | | | | | | | |
| f = 1.11 mm, Fno = 2.43, HFOV = 58.0 deg. | | | | | | | |
| Surface # | | Curvature Radius | Thickness | Material | Index | Abbe # | Focal length |
| 0 | Object | Plano | Infinity | | | | |
| 1 | Lens 1 | 2.94975 (ASP) | 0.321 | Plastic | 1.544 | 55.9 | -1.91 |
| 2 | | 0.73884 (ASP) | 1.361 | | | | |
| 3 | Ape. Stop | Plano | 0.002 | | | | |
| 4 | Lens 2 | 1.10856 (ASP) | 1.214 | Plastic | 1.544 | 55.9 | 1.02 |
| 5 | | -0.68696 (ASP) | -0.156 | | | | |
| 6 | | Plano | 0.226 | | | | |
| 7 | Lens 3 | 3.09810 (ASP) | 0.300 | Plastic | 1.632 | 23.4 | -1.82 |
| 8 | | 0.80752 (ASP) | 0.200 | | | | |
| 9 | IR-filter | Plano | 0.200 | Glass | 1.517 | 64.2 | - |
| 10 | | Plano | 0.050 | | | | |
| 11 | Cover-glass | Plano | 0.400 | Glass | 1.517 | 64.2 | - |
| 12 | | Plano | 0.497 | | | | |
| 13 | Image | Plano | - | | | | |
| Note: A light limiting component placed on surface #6, its effective diameter is 1.00mm. | | | | | | | |

Fig. 7

| TABLE 4 | | | | | | |
|---|---|---|---|---|---|---|
| Aspheric Coefficients | | | | | | |
| Surface # | 1 | 2 | 4 | 5 | 7 | 8 |
| k = | -1.00000E+00 | -9.55269E-01 | -5.61108E+00 | -4.59032E-03 | -1.00000E+00 | -1.00000E+00 |
| A4 = | -1.64984E-02 | 9.53160E-02 | 1.48789E-01 | 2.10840E-01 | -1.78368E+00 | -1.82510E+00 |
| A6 = | -4.46600E-03 | 1.25262E-01 | 1.04269E+00 | 1.94306E-01 | 1.89560E-01 | 2.96610E+00 |
| A8 = | | 2.56170E-02 | -9.05675E+00 | 2.85031E+00 | 5.76350E+00 | -3.56714E+00 |
| A10= | | | 4.95878E+00 | -3.91755E+00 | -1.91390E+01 | 1.71943E+00 |

Fig. 8

| TABLE 5 | | | | | | | |
|---|---|---|---|---|---|---|---|
| (Embodiment 3) | | | | | | | |
| f = 1.00 mm, Fno = 2.80, HFOV = 58.0 deg. | | | | | | | |
| Surface # | | Curvature Radius | Thickness | Material | Index | Abbe # | Focal length |
| 0 | Object | Plano | Infinity | | | | |
| 1 | Lens 1 | 12.50000 (ASP) | 0.700 | Plastic | 1.544 | 55.9 | -2.11 |
| 2 | | 1.03253 (ASP) | 1.803 | | | | |
| 3 | Ape. Stop | Plano | -0.004 | | | | |
| 4 | Lens 2 | 0.85378 (ASP) | 0.846 | Plastic | 1.544 | 55.9 | 0.83 |
| 5 | | -0.62842 (ASP) | 0.070 | | | | |
| 6 | Lens 3 | -6.66670 (ASP) | 0.290 | Plastic | 1.632 | 23.4 | -1.08 |
| 7 | | 0.77452 (ASP) | 0.200 | | | | |
| 8 | IR-filter | Plano | 0.200 | Glass | 1.517 | 64.2 | - |
| 9 | | Plano | 0.050 | | | | |
| 10 | Cover-glass | Plano | 0.400 | Glass | 1.517 | 64.2 | - |
| 11 | | Plano | 0.346 | | | | |
| 12 | Image | Plano | - | | | | |

Fig. 9

| TABLE 6 | | | | | | |
|---|---|---|---|---|---|---|
| Aspheric Coefficients | | | | | | |
| Surface # | 1 | 2 | 4 | 5 | 6 | 7 |
| k = | -1.00000E+00 | -1.49466E-01 | -3.51746E+00 | -2.52640E-01 | -1.00000E+00 | -1.00000E+00 |
| A4 = | -2.94539E-03 | -2.73127E-02 | 2.53076E-01 | 2.84560E-01 | -2.13537E+00 | -1.52219E+00 |
| A6 = | 3.58273E-04 | 7.04273E-03 | -5.55001E-01 | -1.45909E+00 | 1.71662E+00 | 3.42911E+00 |
| A8 = | | 1.57969E-03 | -2.09167E-01 | 3.37049E+00 | -1.58338E+01 | -4.32056E+00 |
| A10= | | | -5.05313E+01 | -6.78299E+00 | 1.42037E+01 | 2.79894E+00 |

Fig. 10

| TABLE 7 | | | | | | | |
|---|---|---|---|---|---|---|---|
| (Embodiment 4) | | | | | | | |
| f = 1.21 mm, Fno = 2.80, HFOV = 49.8 deg. | | | | | | | |
| Surface # | | Curvature Radius | Thickness | Material | Index | Abbe # | Focal length |
| 0 | Object | Plano | Infinity | | | | |
| 1 | Lens 1 | 25.60000 (ASP) | 0.700 | Plastic | 1.514 | 56.8 | -3.82 |
| 2 | | 1.80632 (ASP) | 1.763 | | | | |
| 3 | Ape. Stop | Plano | 0.021 | | | | |
| 4 | Lens 2 | 1.07614 (ASP) | 0.869 | Plastic | 1.514 | 56.8 | 0.89 |
| 5 | | -0.58237 (ASP) | -0.196 | | | | |
| 6 | | Plano | 0.266 | | | | |
| 7 | Lens 3 | -8.15600 (ASP) | 0.366 | Plastic | 1.583 | 30.2 | -1.19 |
| 8 | | 0.77331 (ASP) | 0.200 | | | | |
| 9 | IR-filter | Plano | 0.200 | Glass | 1.517 | 64.2 | - |
| 10 | | Plano | 0.050 | | | | |
| 11 | Cover-glass | Plano | 0.400 | Glass | 1.517 | 64.2 | - |
| 12 | | Plano | 0.288 | | | | |
| 13 | Image | Plano | - | | | | |
| Note: A light limiting component placed on surface #6, its effective diameter is 1.00mm. | | | | | | | |

Fig. 11

| TABLE 8 | | | | | | |
|---|---|---|---|---|---|---|
| Aspheric Coefficients | | | | | | |
| Surface # | 1 | 2 | 4 | 5 | 7 | 8 |
| k = | -1.00000E+00 | 9.61246E-02 | -6.99684E+00 | -2.26305E-01 | -1.00000E+00 | -1.00000E+00 |
| A4 = | 6.83076E-02 | 1.27267E-01 | 2.15239E-01 | 2.29235E-01 | -1.98051E+00 | -1.56125E+00 |
| A6 = | -1.19205E-02 | 8.76646E-02 | 7.89010E-02 | -3.28005E-01 | 1.69865E+00 | 3.00807E+00 |
| A8 = | | -1.86456E-02 | -1.69974E+01 | 4.45158E+00 | -3.92078E+00 | -3.81976E+00 |
| A10= | | | 1.11468E+01 | -1.01836E+01 | -3.61923E+00 | 2.24885E+00 |

Fig. 12

| TABLE 9 | | | | |
|---|---|---|---|---|
| | Embodiment 1 | Embodiment 2 | Embodiment 3 | Embodiment 4 |
| f | 1.14 | 1.11 | 1.00 | 1.21 |
| Fno | 2.43 | 2.43 | 2.80 | 2.80 |
| HFOV | 57.2 | 58.0 | 58.0 | 49.8 |
| V2-V3 | 32.5 | 32.5 | 32.5 | 26.6 |
| T12/f | 1.08 | 1.23 | 1.80 | 1.47 |
| R2/R1 | 0.26 | 0.25 | 0.08 | 0.07 |
| R3/R4 | -1.45 | -1.61 | -1.36 | -1.85 |
| f/f2 | 1.11 | 1.09 | 1.20 | 1.36 |
| f2/f3 | -0.46 | -0.56 | -0.77 | -0.75 |
| Bf/TTL | 0.28 | 0.26 | 0.21 | 0.20 |
| TTL/ImgH | 3.48 | 3.68 | 3.92 | 3.94 |

Fig. 13

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 099108116 filed in Taiwan, R.O.C. on Mar. 19, 2010, the entire contents of which are hereby incorporated by reference.

BACKGROUND OF THE INVENTION

1. Field of the Invention

The present invention relates to a photographing optical lens assembly, and more particularly, to a photographing optical lens assembly for an imaging lens assembly with large angle of view.

2. Description of the Prior Art

A conventional photographing optical lens assembly with large angle of view is generally configured as a frontal lens group with negative refractive power and a rear lens group with positive refractive power, which is so called inverse telephoto structure in order to obtain the wide angle of view feature. Also, for the purpose of aberration correction, there are usually 4-5 or more lens elements in the lens assembly, as disclosed in U.S. Pat. No. 7,515,351. Furthermore, too many lens elements configured in the assembly will prevent the system to become compact, production and manufacturing become relatively complicated, which incurs higher costs and not economically efficient.

In order to obtain high image quality and compact feature, the optical lens assembly with three lens elements becomes a viable solution. U.S. Pat. No. 7,397,612 discloses an imaging lens system with a three-lens structure, which in order from an object-side to an image-side comprises the first lens element with negative refractive power, the second and third lens elements with positive refractive power. However, such arrangement will have larger thickness and curvature radius of the first lens element, which prevents the lens system to become compact.

Therefore, a need exists in the art for a photographing optical lens assembly that features wide angle of view without having a long total track length.

SUMMARY OF THE INVENTION

The present invention provides a photographing optical lens assembly comprising, in order from an object side to an image side: a first lens element with negative refractive power having a concave image-side surface; a second lens element with positive refractive power having a convex object-side surface and a convex image-side surface; and a third lens element with negative refractive power having a concave image-side surface, the object-side and image-side surfaces thereof being aspheric; wherein the photographing optical lens assembly also provides an aperture stop and an electronic sensor; wherein the aperture stop is disposed between the first lens element and the second lens element; wherein the electronic sensor is disposed at the image plane for image formation; wherein there are three lens elements with refractive power in the photographing optical lens assembly; and wherein an Abbe number of the second lens element is V2, an Abbe number of the third lens element is V3, a radius of curvature of the object-side surface of the second lens element is R3, a radius of curvature of the image-side surface of the second lens element is R4, a distance on the optical axis between the image-side surface of the third lens element and the electronic sensor is Bf, a distance on the optical axis between the object-side surface of the first lens element and the electronic sensor is TTL, and they satisfy the relations:

$$25.0 < V2 - V3 < 45.0; \; -3.5 < R3/R4 < -0.5; \; 0.1 < Bf/TTL < 0.5.$$

According to another aspect of the present invention, a photographing optical lens assembly comprises, in order from an object side to an image side: a first lens element with negative refractive power having a convex object-side surface and a concave image-side surface; a second lens element with positive refractive power having a convex image-side surface, at least one of the object-side and image-side surfaces thereof being aspheric; and a third lens element with negative refractive power having the object-side and image-side surfaces thereof being aspheric; wherein the photographing optical lens assembly also provides an aperture stop and an electronic sensor; wherein an aperture stop is disposed between the first lens element and the third lens element; wherein the electronic sensor is disposed at the image plane for image formation; wherein there are three lens elements with refractive power in the photographing optical lens assembly; wherein a focal length of the photographing optical lens assembly is f, a focal length of the second lens element is f2, a distance on the optical axis between the first and second lens elements is T12, and they satisfy the relation:

$$0.5 < T12/f < 2.1; \; -0.95 < f2/f3 < -0.30.$$

Such an arrangement of optical elements can effectively reduce the total track length of the lens assembly, lower the sensitivity of the optical system, and obtain higher resolution image quality.

In the aforementioned photographing optical lens assembly, the first lens element with negative refractive power is able to enlarge the angle of view in photographing optical lens assembly; the second lens element with positive refractive power provides the main refractive power and can reduce the total optical track length of the system; the third lens element with negative refractive power can correct the aberration generated by the second lens element with positive refractive power and the chromatic aberration of the system at the same time.

In the aforementioned photographing optical lens assembly of the present invention, the first lens element having a concave image-side surface can enlarge the angle of view of the photographing optical lens assembly; and when the first lens element has convex object-side and concave image-side surfaces, the refraction of incident light will be less, it can avoid the aberration from becoming too large. Thus, it can obtain a good balance between enlarging the angle of view of the system and correcting aberrations. The second lens element with a convex image-side surface can provide the main refractive power in the system; wherein the second lens element with bi-convex surfaces can effectively enhance the refractive power of the second lens element and reduce the total track length of the photographing optical lens assembly. The third lens element with a concave image-side surface enables the principal point of the optical system further away from the image plane and reduces the total track length of the photographing optical lens assembly; wherein the third lens element can have a convex or concave object-side surface. When the third lens element has a convex object-side surface, the astigmatism and high order aberration of the system can be corrected. When the third lens element has a concave object-side surface, the total track length of the lens assembly can be effectively reduced to maintain its compact form.

In addition, in present photographing optical lens assembly, the third lens element can have inflection points, which can effectively reduce the incident angle of off-axis light projecting onto the sensor and correct the aberration of off-axis field of view. Moreover, in present photographing optical lens assembly, the aperture stop can be disposed between the first lens element and the second lens element or the second lens element and the third lens element. In a wide angle optical system, correction in distortion and chromatic aberration of magnification is especially needed, and by placing the aperture stop at the position where the refractive power of the system is balanced. Therefore, present photographing optical lens assembly places the aperture stop between the first lens element and the third lens element in order to obtain a balance between reducing the total track length of the lens assembly and the wide angle of view; furthermore, the aperture stop is disposed between the first lens element and the second lens element.

BRIEF DESCRIPTION OF THE DRAWINGS

FIG. 5 is TABLE 1 which lists the optical data of the first embodiment.

FIG. 6 is TABLE 2 which lists the aspheric surface data of the first embodiment.

FIG. 7 is TABLE 3 which lists the optical data of the second embodiment.

FIG. 8 is TABLE 4 which lists the aspheric surface data of the second embodiment.

FIG. 9 is TABLE 5 which lists the optical data of the third embodiment.

FIG. 10 is TABLE 6 which lists the aspheric surface data of the third embodiment.

FIG. 11 is TABLE 7 which lists the optical data of the fourth embodiment.

FIG. 12 is TABLE 8 which lists the aspheric surface data of the fourth embodiment.

FIG. 13 is TABLE 9 which lists the data of the respective embodiments resulting from the equations.

DETAILED DESCRIPTION OF THE PREFERRED EMBODIMENTS

Figure 1A:
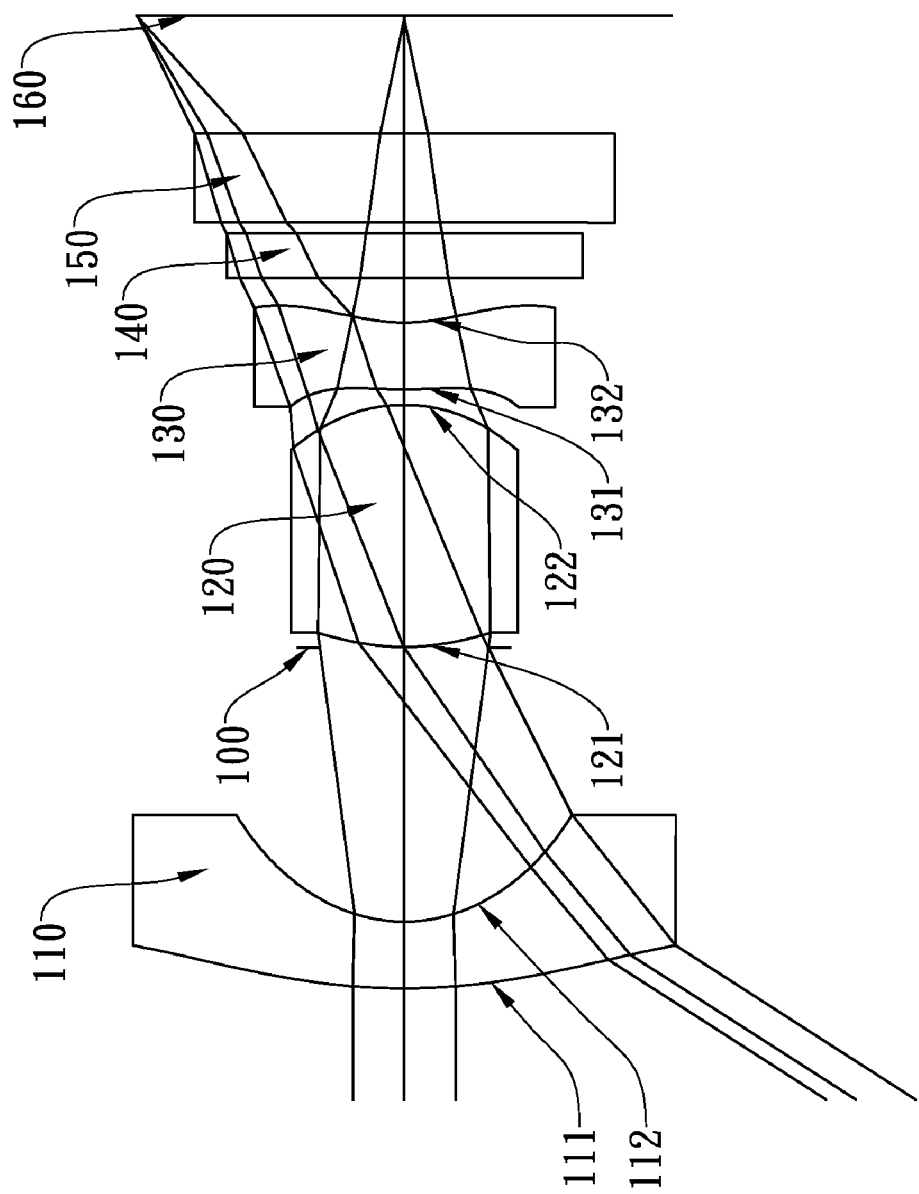
FIG. 1A shows a photographing optical lens assembly in accordance with a first embodiment of the present invention.

The present invention provides a photographing optical lens assembly comprising, in order from an object side to an image side: a first lens element with negative refractive power having a concave image-side surface; a second lens element with positive refractive power having a convex object-side surface and a convex image-side surface; and a third lens element with negative refractive power having a concave image-side surface, the object-side and image-side surfaces thereof being aspheric; wherein the photographing optical lens assembly further provides an aperture stop and an electronic sensor, wherein an aperture stop is disposed between the first lens element and the second lens element; wherein the electronic sensor is disposed at the image plane for image formation; wherein there are three lens elements with refractive power in the photographing optical lens assembly; and wherein the Abbe number of the second lens element is V2, the Abbe number of the third lens element is v3, the radius of curvature of the object-side surface of the second lens element is R3, the radius of curvature of the image-side surface of the second lens element is R4, the distance on the optical axis between the image-side surface of the third lens element and the electronic sensor is Bf, the distance on the optical axis between the object-side surface of the first lens element and the electronic sensor is TTL, and they satisfy the relations: $25.0<V2-V3<45.0$; $-3.5<R3/R4<-0.5$; $0.1<Bf/TTL<0.5$.

When the aforementioned photographing optical lens assembly satisfies the relation: $25.0<V2-V3<45.0$, chromatic aberration in the photographing optical lens assembly can be favorably corrected; preferably, satisfies the relation: $31.0<V2-V3<38.0$. When the aforementioned photographing optical lens assembly satisfies the relation: $-3.5<R3/R4<-0.5$, the spherical aberration of the system can be favorably corrected in order to improve image quality; preferably, satisfies the relation: $-2.0<R3/R4<-1.0$. When the aforementioned photographing optical lens assembly satisfies the relation: $0.1<Bf/TTL<0.5$, there is sufficient back focal distance to allocate additional components in the photographing optical lens assembly; preferably, it satisfies the relation: $0.15<Bf/TTL<0.35$.

In the aforementioned photographing optical lens assembly of the present invention, preferably, the first lens element has a convex object-side surface, wherein the first lens element is a meniscus lens with convex object-side surface and concave image-side surfaces, which enlarges the angle of view without generating too much aberration; preferably, the third lens element is a meniscus lens with a convex object-side surface and a concave image-side surface, which favorably corrects the astigmatism and high order aberration of the system.

In the aforementioned photographing optical lens assembly of the present invention, preferably, the third lens element is plastic, which is favorable for manufacturing of lenses with non-spherical surfaces and reduction of production costs.

In the aforementioned photographing optical lens assembly of the present invention, the focal length of the photographing optical lens assembly is f, the focal length of the second lens element is f2; preferably, they satisfy the relation: $0.9<f/f2<1.8$. When f/f2 satisfies the relation, the refractive power of the second lens element is more balanced, which effectively controls the total optical track length and prevents the high order spherical aberration from becoming too large, in order to improve the image quality of the system; preferably, they satisfy the relation: $1.0<f/f2<1.3$.

In the aforementioned photographing optical lens assembly of the present invention, the radius of curvature on the object-side surface of the first lens element is R1, the radius of curvature on the image-side surface of the first lens element is R2; preferably, they satisfy the relation: $0.0<R2/R1<0.3$. When R2/R1 satisfies the relation, the angle of view of the photographing optical lens assembly can be favorably increased, which provides the feature of wide angle of view.

In the aforementioned photographing optical lens assembly of the present invention, the focal length of the second lens element is f2, the focal length of the third lens element is f3; preferably, they satisfy the relation: −0.95<f2/f3<−0.30.

When f2/f3 satisfies the relation, the refractive power of the second lens element and the third lens element is more balanced, which corrects aberration and lowers the sensitivity of the system.

In the aforementioned photographing optical lens assembly of the present invention, the focal length of the photographing lens assembly is f, the distance on the optical axis between the first lens element and the second lens element is T12; preferably, they satisfy the relation: 0.5<T12/f<2.1. When T12/f satisfies the relation, the angle of off-axis light projecting onto the sensor can be effectively reduced in order to improve the photosensitivity of the system.

In the aforementioned photographing optical lens assembly of the present invention, the distance on the optical axis between the object-side surface of the first lens element and the electronic sensor is TTL, half of the diagonal length of the effective pixel area of the electronic sensor is ImgH; preferably, they satisfy the relation: TTL/ImgH<4.1. When TTL/ImgH satisfies the relation, the compact design of the photographing optical lens assembly can be favorably maintained.

According to another aspect of the present invention, a photographing optical lens assembly, in order of an object side surface to an image-side surface, comprises: a first lens element with negative refractive power having a convex object-side surface and a concave image-side surface; a second lens element with positive refractive power having a convex image-side surface, at least one of the object-side and image-side surfaces thereof being aspheric; and a third lens element with negative refractive power, the object-side and image-side surfaces thereof being aspheric; wherein the photographing optical lens assembly further provides an aperture stop and an electronic sensor; wherein the aperture stop is disposed between the first lens element and the third lens element; wherein the electronic sensor is provided at the image plane for image formation; wherein there are three lens elements with refractive power in the photographing optical lens assembly; and wherein the focal length of the photographing optical lens assembly is f, the focal length of the second lens element is f2, the focal length of the third lens element is f3, the distance on the optical axis between the first lens element and the second lens element is T12, and they satisfy the relations: 0.5<T12/f<2.1; −0.95<f2/f3<−0.30.

When the aforementioned photographing optical lens assembly satisfies the relation: 0.5<T12/f<2.1, the angle of off-axis light projecting onto the sensor can be effectively reduced in order to improve the photosensitivity of the system; preferably, they satisfy the relation: 0.8<T12/f<1.8. When the aforementioned photographing optical lens assembly satisfies the relation: −0.95<f2/f3<−0.30, the refractive power of the second lens element and the third lens element is more balanced, which corrects aberration and lowers the sensitivity of the system.

In the aforementioned photographing optical lens assembly of the present invention, preferably, the third lens element can have a concave image-side surface. This makes the principal point of the optical system further away from the image plane, which favorably reduces the total optical track length in order to keep the lens assembly compact; preferably, the third lens element can have a convex object-side surface, which can correct the astigmatism and high order aberration of the system; wherein the third lens element can have at least one inflection point on the image-side surface, which can effectively reduce the angle of off-axis light projecting onto the electronic sensor, and can further correct the aberration of the off-axis field of view.

In the aforementioned photographing optical lens assembly of the present invention, preferably, the third lens element can be made of plastic, which is favorable for manufacturing of non-spherical lenses and reducing the production costs.

In the aforementioned photographing optical lens assembly of the present invention, the focal length of the photographing optical lens assembly is f, the focal length of the second lens element is f2; preferably, they satisfy the relation: 0.9<f/f2<1.8. When f/f2 satisfies the relation, the refractive power of the second lens element is more balanced, which effectively controls the total optical track length of the system while preventing the high order spherical aberration from becoming too large, in order to improve system image quality; preferably, they satisfy the relation: 1.0<f/f2<1.3.

In the aforementioned photographing optical lens assembly of the present invention, the distance on the optical axis between the image-side surface of the third lens element and the electronic sensor is Bf, the distance on the optical axis between the object-side surface of the first lens element and the electronic sensor is TTL; preferably, they satisfy the relation: 0.1<Bf/TTL<0.5. When Bf/TTL satisfies the relation, there is sufficient back focal distance to allocate other components in the photographing optical lens assembly.

In the aforementioned photographing optical lens assembly of the present invention, the Abbe number of the second lens element is V2, the Abbe number of the third lens element is V3; preferably, they satisfy the relation: 31.0<V2−V3<38.0. When V2−V3 satisfies the relation, the chromatic aberration of the photographing optical lens assembly can be favorably corrected.

In the aforementioned photographing optical lens assembly of the present invention, the radius of curvature on the object-side surface of the second lens element is R3, the radius of curvature on the image-side surface of the second lens element is R4; preferably, they satisfy the relation: −2.0<R3/R4<−1.0. When R3/R4 satisfies the relation, the spherical aberration can be favorably corrected in order to improve image quality.

In the present photographing optical lens assembly, the lens elements can be made of glass or plastic material. If the lens elements are made of glass, there is more freedom in distributing the refractive power of the system. If the lens elements are made of plastic, the manufacturing cost will be reduced effectively. Furthermore, the surfaces of the lens elements can be made into aspheric surfaces. Aspheric surfaces can be easily made into non-spherical profiles, allowing more design parameter freedom which can be used to reduce aberrations and the number of the lens elements, and the total track length of the photographing optical lens assembly can be effectively reduced.

In the present photographing optical lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
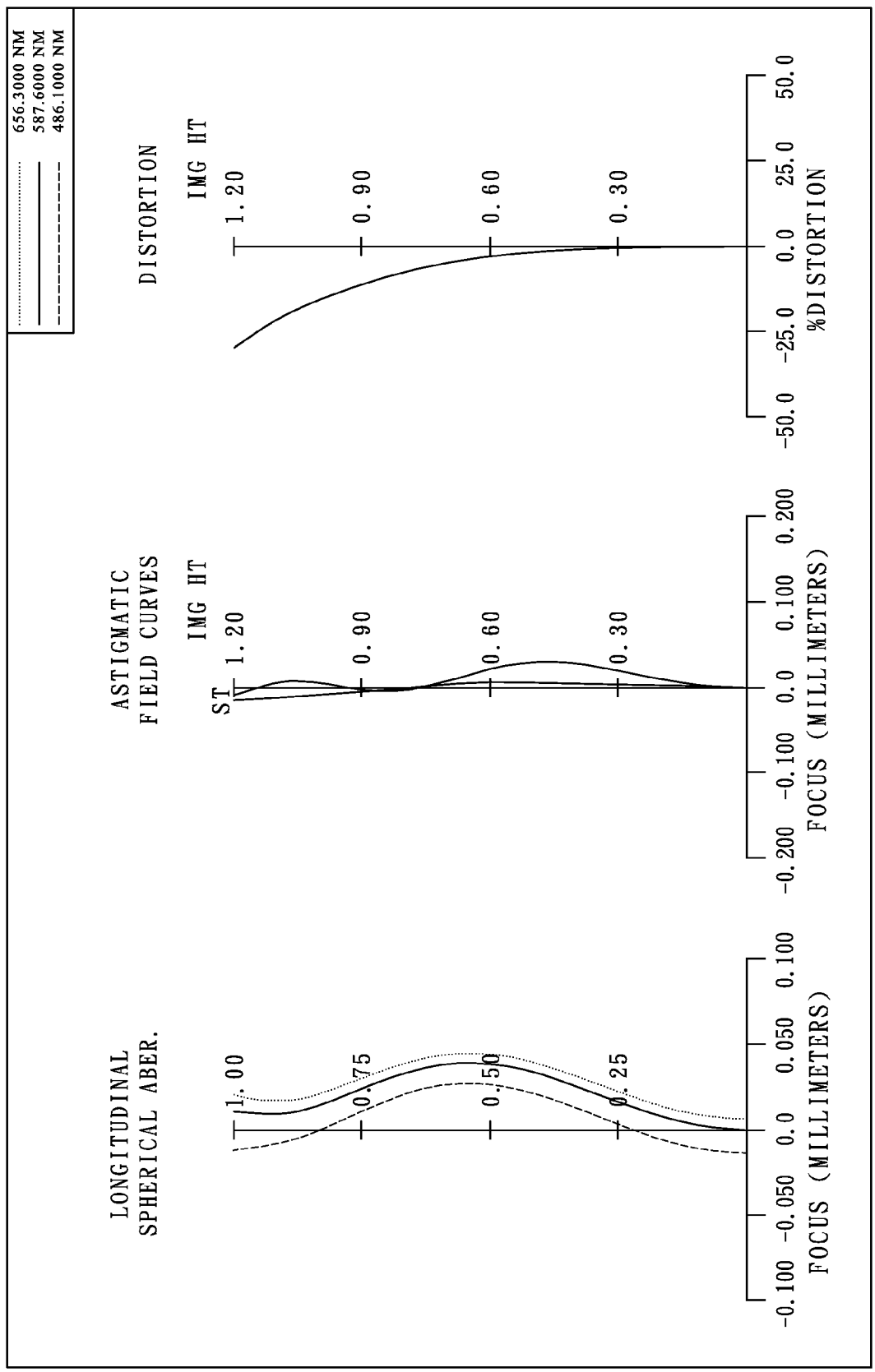
FIG. 1B shows the aberration curves of the first embodiment of the present invention.

FIG. 1A shows a photographing optical lens assembly in accordance with a first embodiment of the present invention, and FIG. 1B shows the aberration curves of the first embodiment of the present invention. The photographing optical lens assembly of the first embodiment of the present invention mainly comprises three lens elements, in order from an object side to an image side: a plastic first lens element 110 with negative refractive power having a convex object-side surface 111 and a concave image-side surface 112, the object-side and image-side surfaces 111 and 112 thereof being aspheric; a plastic second lens element 120 with positive refractive power having a convex object-side surface 121 and a convex image-side surface 122, the object-side and image-side surfaces 121 and 122 thereof being aspheric; a plastic third lens element 130 with positive refractive power having a convex object-side surface 131 and a concave image-side surface 132, both of the object-side and image-side surfaces 131 and 132 thereof being aspheric, at least one inflection point on the image-side surface 132 of the third lens element 130; and wherein an aperture stop 100 is disposed between the first lens element 110 and the second lens element 120; wherein an IR filter 140 is disposed between the image-side surface 132 of the third lens element 130 and the image plane 160, and a cover-glass 150 is disposed between the IR filter 140 and the image plane 160; and wherein the IR filter 140 is made of glass and has no influence on the focal length of the photographing optical lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, and it satisfies the relation: f=1.14 (mm).

In the first embodiment of the present photographing optical lens assembly, the f-number of the photographing optical lens assembly is Fno, and it satisfies the relation: Fno=2.43.

In the first embodiment of the present photographing optical lens assembly, half of the maximal field of view of the photographing optical lens assembly is HFOV, and it satisfies the relation: HFOV=57.2 deg.

In the first embodiment of the present photographing optical lens assembly, the Abbe number of the second lens element 120 is V2, the Abbe number of the third lens element 130 is V3, and they satisfy the relation: V2−V3=32.5.

In the first embodiment of the present photographing optical lens assembly, the focal length of the photographing optical lens assembly is f, the distance on the optical axis between the first lens element 110 and the second lens element 120 is T12, and they satisfy the relation: T12/f=1.08.

In the first embodiment of the present photographing optical lens assembly, the radius of curvature of the object-side surface 111 of the first lens element 110 is R1, the radius of curvature of the image-side surface 112 of the first lens element 110 is R2, and they satisfy the relation: R2/R1=0.26.

In the first embodiment of the present photographing optical lens assembly, the radius of curvature of the object-side surface 121 of the second lens element 120 is R3, the radius of curvature of the image-side surface 122 of the second lens element 120 is R4, and they satisfy the relation: R3/R4=−1.45.

In the first embodiment of the present photographing optical lens assembly, the focal length of the photographing optical lens assembly is f, the focal length of the second lens element 120 is f2, and they satisfy the relation: f/f2=1.11.

In the first embodiment of the present photographing optical lens assembly, the focal length of the second lens element 120 is f2, the focal length of the third lens element 130 is f3, and they satisfy the relation: f2/f3=−0.46.

In the first embodiment of the present photographing optical lens assembly, the photographing optical lens assembly further provides an electronic sensor for image formation at the image plane 160; wherein the distance on the optical axis between the image-side surface 132 of the third lens element 130 is Bf, the distance on the optical axis between the object-side surface of the first lens element and the electronic sensor is TTL, and they satisfy the relation: Bf/TTL=0.28.

In the first embodiment of the present photographing optical lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=3.48.

The detailed optical data of the first embodiment is shown in FIG. 5 (TABLE 1), and the aspheric surface data is shown in FIG. 6 (TABLE 2), wherein the units of the radius of curvature, the thickness and the focal length are expressed in mm, and HFOV is half of the maximal field of view.

Figure 2A:
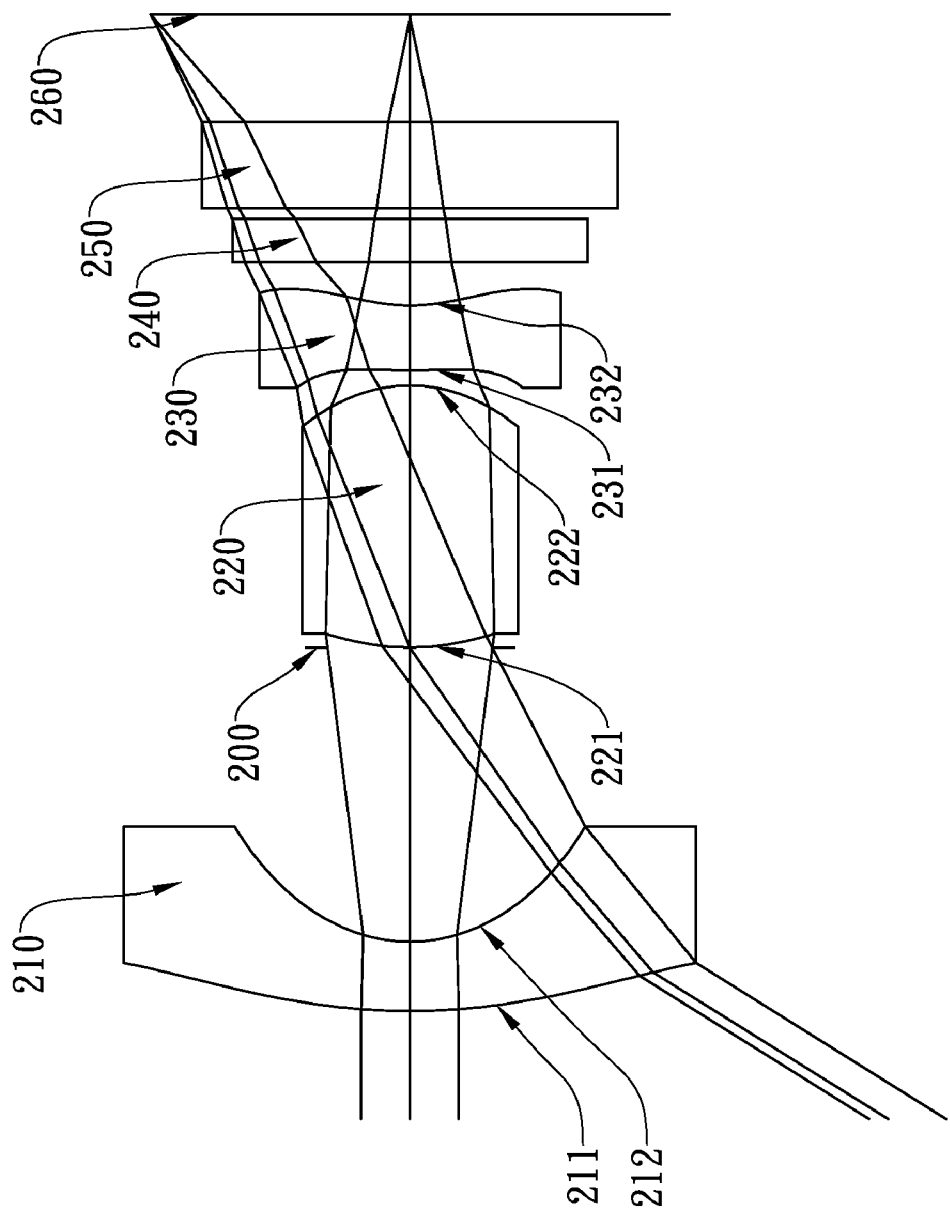
FIG. 2A shows a photographing optical lens assembly in accordance with a second embodiment of the present invention.
Figure 2B:
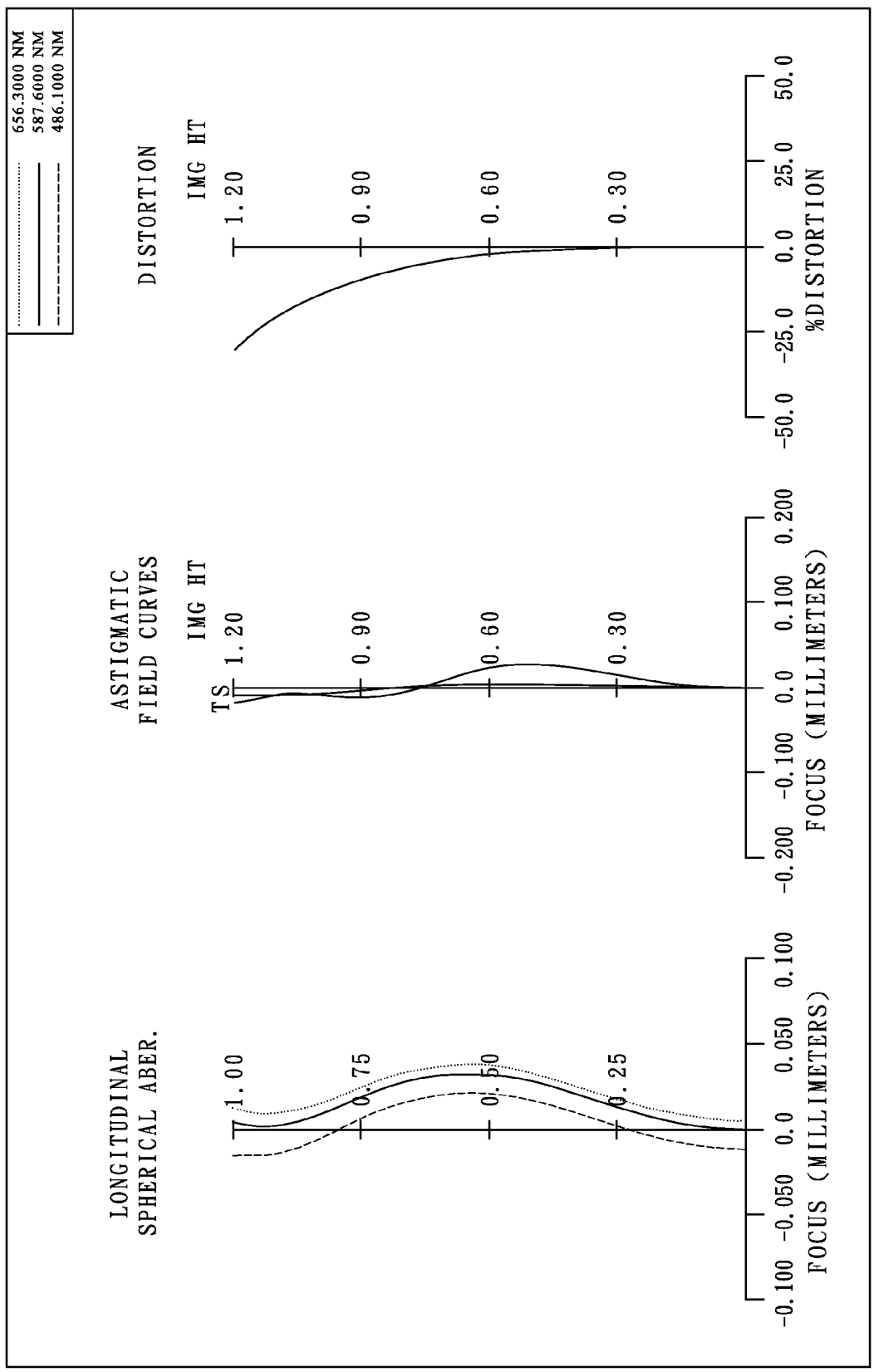
FIG. 2B shows the aberration curves of the second embodiment of the present invention.

FIG. 2A shows a photographing optical lens assembly in accordance with a second embodiment of the present invention, and FIG. 2B shows the aberration curves of the second embodiment of the present invention. The photographing optical lens assembly of the second embodiment of the present invention mainly comprises three lens elements, in order from the object side to the image side: a plastic first lens element 210 with negative refractive power having a convex object-side surface 211 and a concave image-side surface 212, the object-side and image-side surfaces 211 and 212 thereof being aspheric; a plastic second lens element 220 with positive refractive power having a convex object-side surface 221 and a convex image-side surface 222, the object-side and image-side surfaces 221 and 222 thereof being aspheric; a plastic third lens element 230 with negative refractive power having a convex object-side surface 231 and a concave image-side surface 232, the object-side and image-side surfaces 231 and 232 thereof being aspheric, at least one inflection point formed on the image-side surface 232; and wherein an aperture stop 200 is disposed between the first lens element 210 and the second lens element 220; wherein an IR filter 240 is disposed between the image-side surface 232 of the third lens element 230 and the image plane 260, and a cover-glass 250 is disposed between the IR filter 240 and the image plane 260; and wherein the IR filter 240 and the cover-glass are made of glass and have no influence on the focal length of the photographing optical lens assembly.

The equation of the aspheric surface profiles of the second embodiment has the same form as that of the first embodiment.

In the second embodiment of the present photographing optical lens assembly, the focal length of the photographing optical lens assembly is f, and it satisfies the relation: f=1.11 (mm).

In the second embodiment of the present photographing optical lens assembly, the f-number of the photographing optical lens assembly is Fno, and it satisfies the relation: Fno=2.43.

In the second embodiment of the present photographing optical lens assembly, half of the maximal field of view of the photographing optical lens assembly is HFOV, and it satisfies the relation: HFOV=58.0 deg.

In the second embodiment of the present photographing optical lens assembly, the Abbe number of the second lens element 220 is V2, the Abbe number of the third lens element 230 is V3, and they satisfy the relation: V2−V3=32.5.

In the second embodiment of the present photographing optical lens assembly, the focal length of the photographing optical lens assembly is f, the distance on the optical axis between the first lens element 210 and the second lens element 220 is T12, and they satisfy the relation: T12/f=1.23.

In the second embodiment of the present photographing optical lens assembly, the radius of curvature of the object-side surface 211 of the first lens element 210 is R1, the radius of curvature of the image-side surface 212 of the first lens element 210 is R2, and they satisfy the relation: R2/R1=0.25.

In the second embodiment of the present photographing optical lens assembly, the radius of curvature of the object-side surface 221 of the second lens element 220 is R3, the radius of curvature of the image-side surface 222 of the second lens element 220 is R4, and they satisfy the relation: R3/R4=−1.61.

In the second embodiment of the present photographing optical lens assembly, the focal length of the photographing optical lens assembly is f, the focal length of the second lens element 220 is f2, and they satisfy the relation: f/f2=1.09.

In the second embodiment of the present photographing optical lens assembly, the focal length of the second lens element 220 is f2, the focal length of the third lens element 230 is f3, and they satisfy the relation: f2/f3=−0.56.

In the second embodiment of the present photographing optical lens assembly, the photographing optical lens assembly further provides an electronic sensor for image formation at the image plane 260; wherein the distance on the optical axis between the image-side surface 232 of the third lens element 230 is Bf, the distance on the optical axis between the object-side surface of the first lens element and the electronic sensor is TTL, and they satisfy the relation: Bf/TTL=0.26.

In the second embodiment of the present photographing optical lens assembly, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=3.68.

The detailed optical data of the second embodiment is shown in FIG. 7 (TABLE 3), and the aspheric surface data is shown in FIG. 8 (TABLE 4), wherein the units of the radius of curvature, the thickness and the focal length are expressed in mm, and HFOV is half of the maximal field of view.

Figure 3A:
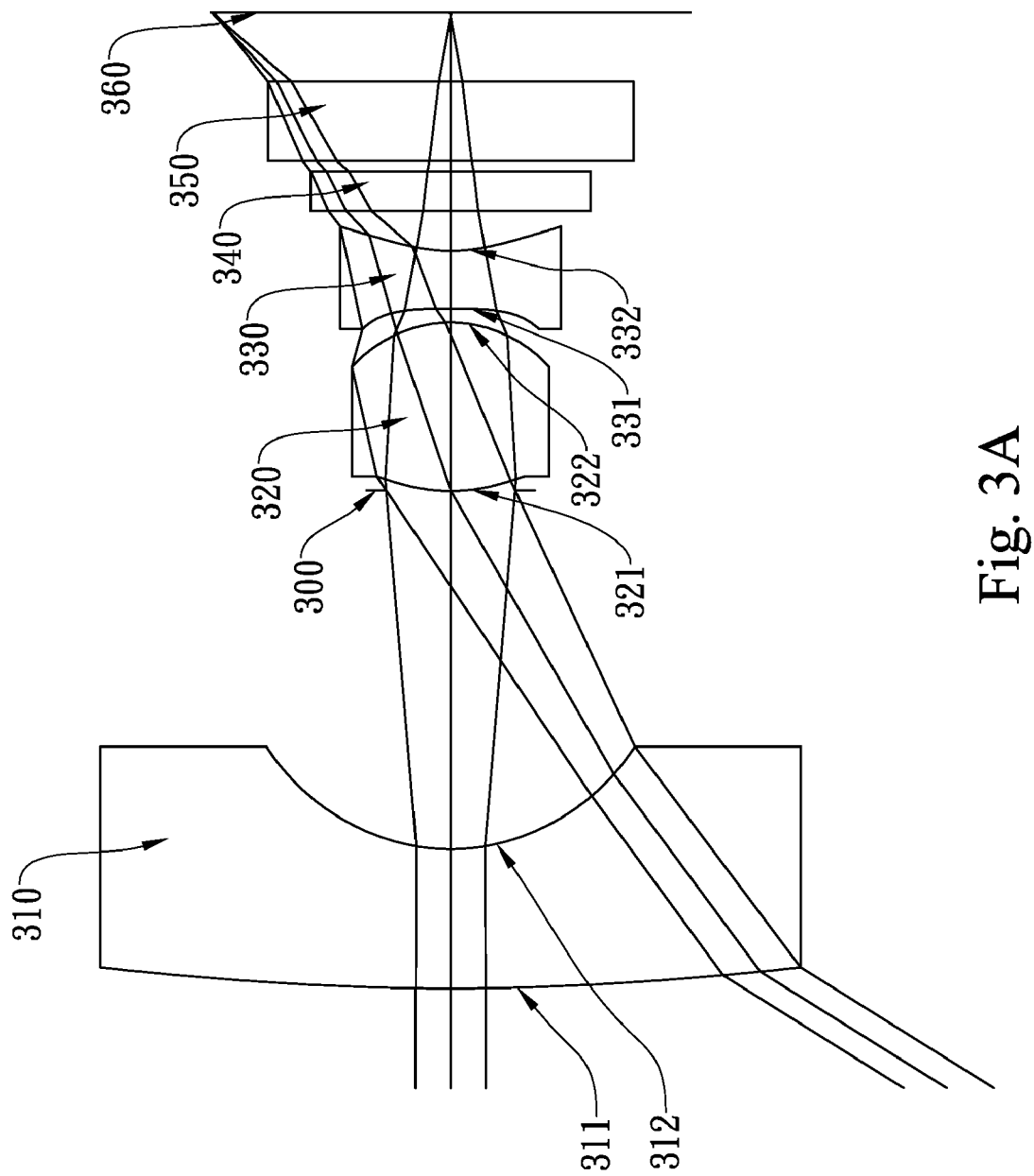
FIG. 3A shows a photographing optical lens assembly in accordance with a third embodiment of the present invention.
Figure 3B:
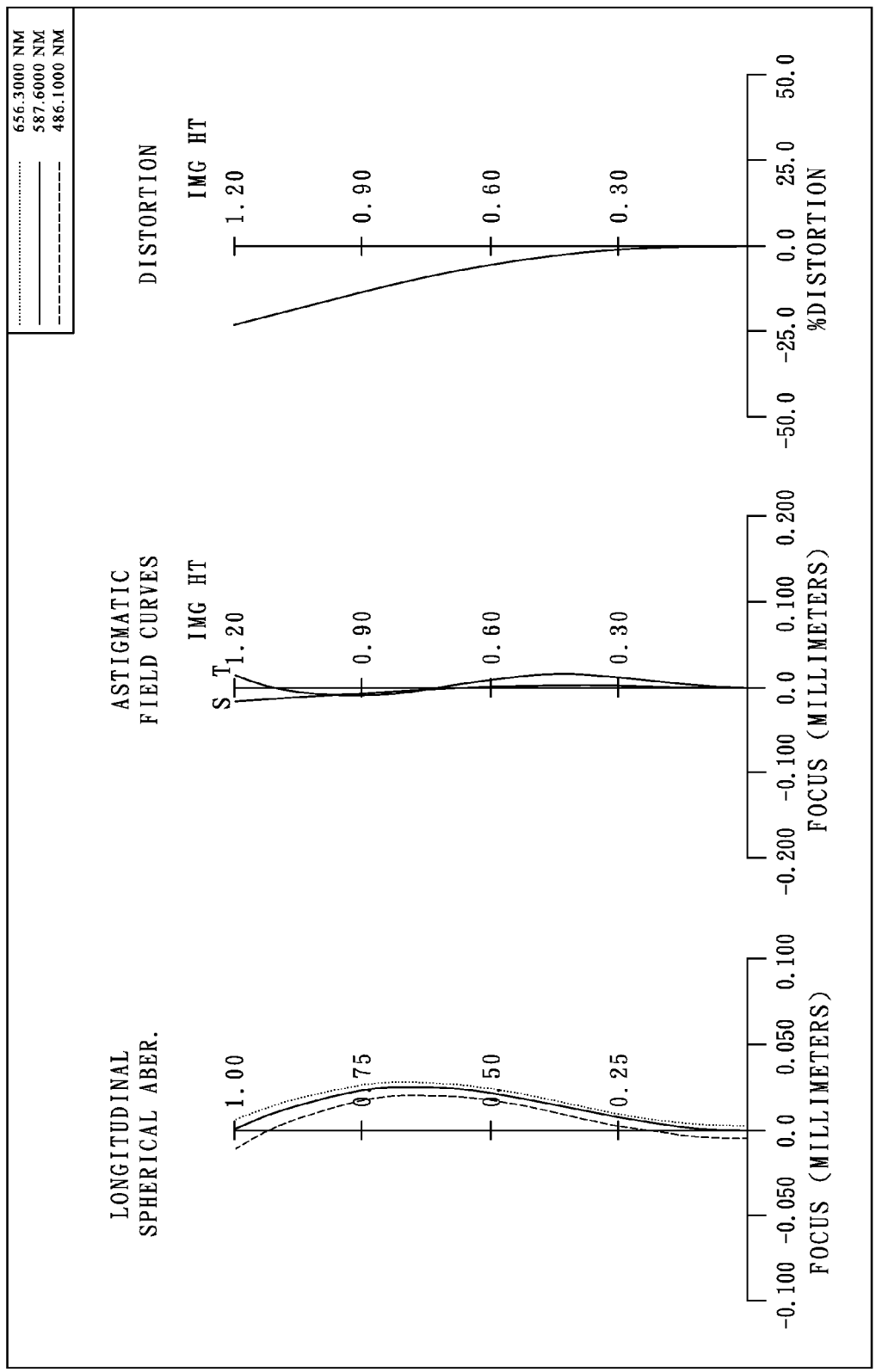
FIG. 3B shows the aberration curves of the third embodiment of the present invention.

FIG. 3A shows a photographing optical lens assembly in accordance with a third embodiment of the present invention, and FIG. 3B shows the aberration curves of the third embodiment of the present invention. The photographing optical lens assembly of the third embodiment of the present invention mainly comprises three lens elements, in order from the object side to the image side: a plastic first lens element 310 with negative refractive power having a convex object-side surface 311 and a concave image-side surface 312, the object-side and image-side surfaces 311 and 312 thereof being aspheric; a plastic second lens element 320 with positive refractive power having a convex object-side surface 321 and a convex image-side surface 322, the object-side and image-side surfaces 321 and 322 thereof being aspheric; a plastic third lens element 330 with negative refractive power having a concave object-side surface 331 and a concave image-side surface 332, the object-side and image-side surfaces 331 and 332 thereof being aspheric; and wherein an aperture stop 300 is disposed between the first lens element 310 and the second lens element 320; wherein an IR filter 340 is disposed between the image-side surface 332 of the third lens element 330 and the image plane 360, and a cover-glass 350 is disposed between the IR filter 340 and the image plane 360; and wherein the IR filter 340 and the cover-glass 350 are made of glass and have no influence on the focal length of the photographing optical lens assembly.

The equation of the aspheric surface profiles of the third embodiment has the same form as that of the first embodiment.

In the third embodiment of the present photographing optical lens assembly, the focal length of the photographing optical lens assembly is f, and it satisfies the relation: f=1.00 (mm).

In the third embodiment of the present photographing optical lens assembly, the f-number of the photographing optical lens assembly is Fno, and it satisfies the relation: Fno=2.80.

In the third embodiment of the present photographing optical lens assembly, half of the maximal field of view of the photographing optical lens assembly is HFOV, and it satisfies the relation: HFOV=58.0 deg.

In the third embodiment of the present photographing optical lens assembly, the Abbe number of the second lens element 320 is V2, the Abbe number of the third lens element 330 is V3, and they satisfy the relation: V2−V3=32.5.

In the third embodiment of the present photographing optical lens assembly, the focal length of the photographing optical lens assembly is f, the distance on the optical axis between the first lens element 310 and the second lens element 320 is T12, and they satisfy the relation: T12/f=1.80.

In the third embodiment of the present photographing optical lens assembly, the radius of curvature of the object-side surface 311 of the first lens element 310 is R1, the radius of curvature of the image-side surface 312 of the first lens element 310 is R2, and they satisfy the relation: R2/R1=0.08.

In the third embodiment of the present photographing optical lens assembly, the radius of curvature of the object-side surface 321 of the second lens element 320 is R3, the radius of curvature of the image-side surface 322 of the second lens element 320 is R4, and they satisfy the relation: R3/R4=−1.36.

In the third embodiment of the present photographing optical lens assembly, the focal length of the photographing optical lens assembly is f, the focal length of the second lens element 320 is f2, and they satisfy the relation: f/f2=1.20.

In the third embodiment of the present photographing optical lens assembly, the focal length of the second lens element 320 is f2, the focal length of the third lens element 330 is f3, and they satisfy the relation: f2/f3=−0.77.

In the third embodiment of the present photographing optical lens assembly, the photographing optical lens assembly further provides an electronic sensor for image formation at the image plane 360; wherein the distance on the optical axis between the image-side surface 332 of the third lens element 330 is Bf, the distance on the optical axis between the object-side surface of the first lens element and the electronic sensor is TTL, and they satisfy the relation: Bf/TTL=0.21.

In the third embodiment of the present photographing optical lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=3.92.

The detailed optical data of the third embodiment is shown in FIG. 9 (TABLE 5), and the aspheric surface data is shown in FIG. 10 (TABLE 6), wherein the units of the radius of curvature, the thickness and the focal length are expressed in mm, and HFOV is half of the maximal field of view.

Figure 4A:
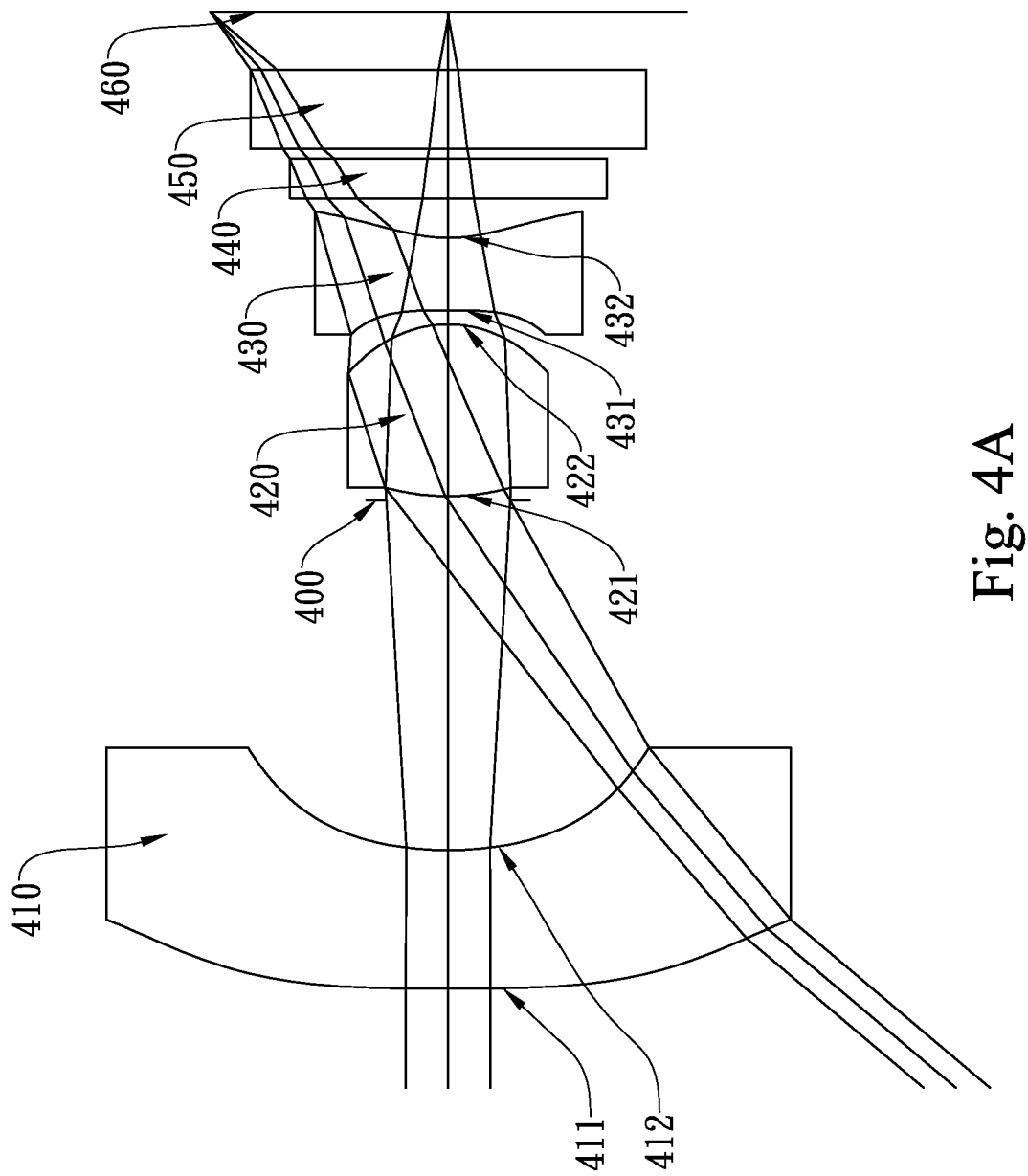
FIG. 4A shows a photographing optical lens assembly in accordance with a fourth embodiment of the present invention.
Figure 4B:
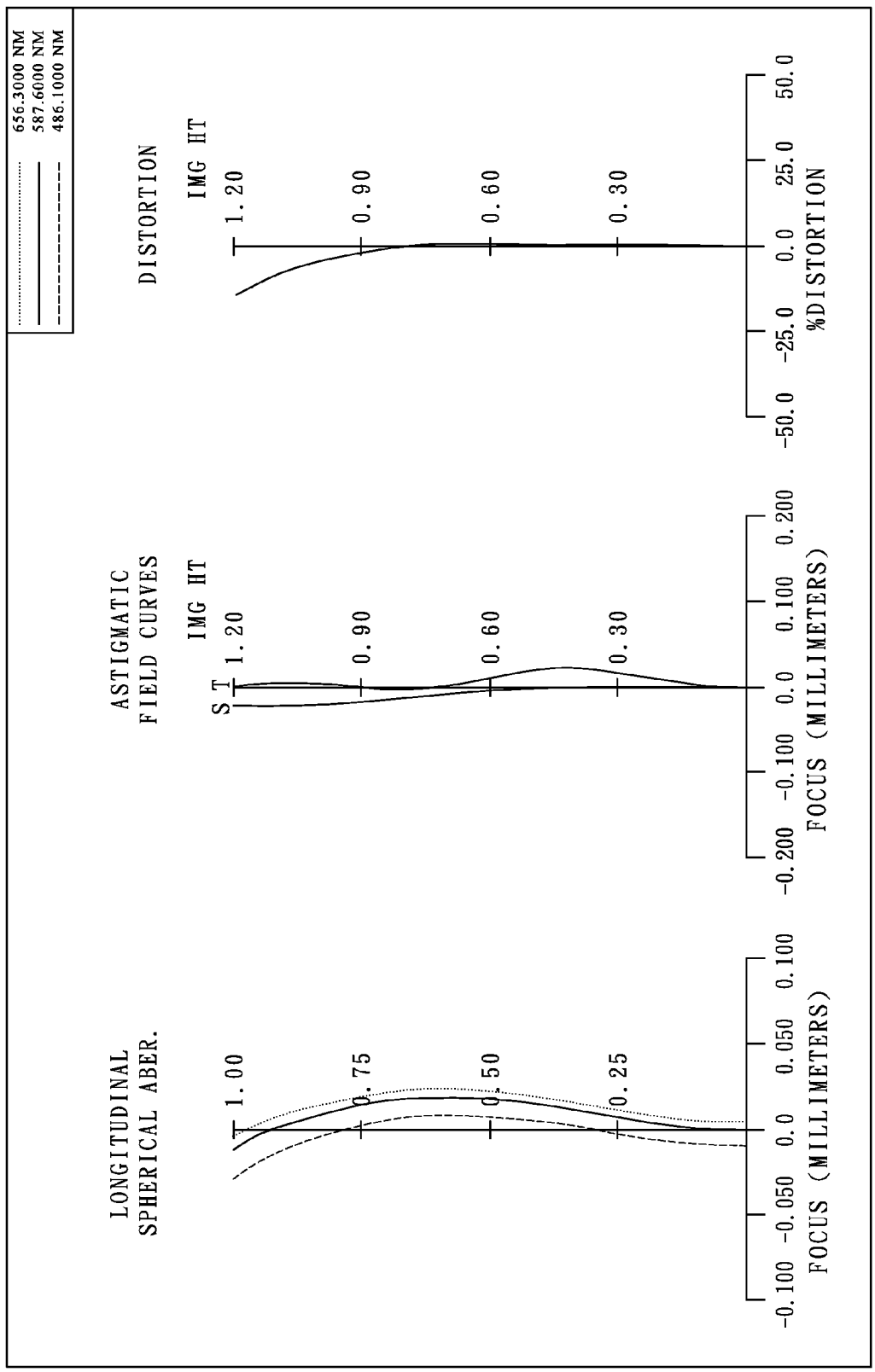
FIG. 4B shows the aberration curves of the fourth embodiment of the present invention.

FIG. 4A shows a photographing optical lens assembly in accordance with a fourth embodiment of the present invention, and FIG. 4B shows the aberration curves of the fourth embodiment of the present invention. The photographing optical lens assembly of the fourth embodiment of the present invention mainly comprises three lens elements, in order from the object side to the image side: a plastic first lens element 410 with negative refractive power having a convex object-side surface 411 and a concave image-side surface 412, the object-side and image-side surfaces 411 and 412 thereof being aspheric; a plastic second lens element 420 with positive refractive power having a convex object-side surface 421 and a convex image-side surface 422, the object-side and image-side surfaces 421 and 422 thereof being aspheric; a plastic third lens element 430 with negative refractive power having a concave object-side surface 431 and a concave image-side surface 432, the object-side and image-side surfaces 431 and 432 thereof being aspheric, at least one inflection point formed on the image-side surface 432; and wherein an aperture stop 400 is disposed between the first lens element 410 and the second lens element 420; wherein an IR filter 440 is disposed between the image-side surface 432 of the third lens element 430 and the image plane 460, and a cover-glass 450 is disposed between the IR filter 440 and the image plane 460; and wherein the IR filter 440 and the cover-glass 450 are made of glass and have no influence on the focal length of the photographing optical lens assembly.

The equation of the aspheric surface profiles of the fourth embodiment has the same form as that of the first embodiment.

In the fourth embodiment of the present photographing optical lens assembly, the focal length of the photographing optical lens assembly is f, and it satisfies the relation: f=1.21 (mm).

In the fourth embodiment of the present photographing optical lens assembly, the f-number of the photographing optical lens assembly is Fno, and it satisfies the relation: Fno=2.80.

In the fourth embodiment of the present photographing optical lens assembly, half of the maximal field of view of the photographing optical lens assembly is HFOV, and it satisfies the relation: HFOV=49.8 deg.

In the fourth embodiment of the present photographing optical lens assembly, the Abbe number of the second lens element 420 is V2, the Abbe number of the third lens element 430 is V3, and they satisfy the relation: V2−V3=26.6.

In the fourth embodiment of the present photographing optical lens assembly, the focal length of the photographing optical lens assembly is f, the distance on the optical axis between the first lens element 410 and the second lens element 420 is T12, and they satisfy the relation: T12/f=1.47.

In the fourth embodiment of the present photographing optical lens assembly, the radius of curvature of the object-side surface 411 of the first lens element 410 is R1, the radius of curvature of the image-side surface 412 of the first lens element 410 is R2, and they satisfy the relation: R2/R1=0.07.

In the fourth embodiment of the present photographing optical lens assembly, the radius of curvature of the object-side surface 421 of the second lens element 420 is R3, the radius of curvature of the image-side surface 422 of the second lens element 420 is R4, and they satisfy the relation: R3/R4=−1.85.

In the fourth embodiment of the present photographing optical lens assembly, the focal length of the photographing optical lens assembly is f, the focal length of the second lens element 420 is f2, and they satisfy the relation: f/f2=1.36.

In the fourth embodiment of the present photographing optical lens assembly, the focal length of the second lens element 420 is f2, the focal length of the third lens element 430 is f3, and they satisfy the relation: f2/f3=−0.75.

In the fourth embodiment of the present photographing optical lens assembly, the photographing optical lens assembly further provides an electronic sensor for image formation at the image plane 460; wherein the distance on the optical axis between the image-side surface 432 of the third lens element 430 is Bf, the distance on the optical axis between the object-side surface of the first lens element and the electronic sensor is TTL, and they satisfy the relation: Bf/TTL=0.20.

In the fourth embodiment of the present photographing optical lens assembly, the distance on the optical axis between the object-side surface 411 of the first lens element 410 and the electronic sensor is TTL, half of the diagonal length of the effective pixel area of the electronic sensor is ImgH, and they satisfy the relation: TTL/ImgH=3.94.

The detailed optical data of the fourth embodiment is shown in FIG. 11 (TABLE 7), and the aspheric surface data is shown in FIG. 12 (TABLE 8), wherein the units of the radius of curvature, the thickness and the focal length are expressed in mm, and HFOV is half of the maximal field of view.

It is to be noted that TABLES 1-8 (illustrated in FIGS. 5-12 respectively) show different data of the different embodiments, however, the data of the different embodiments are obtained from experiments. Therefore, any photographing optical lens assembly of the same structure is considered to be within the scope of the present invention even if it uses different data. The embodiments depicted above and the appended drawings are exemplary and are not intended to limit the claim scope of the present invention. TABLE 9 (illustrated in FIG. 13) shows the data of the respective embodiments resulting from the equations.

What is claimed is:

1. A photographing optical lens assembly comprising, in order from an object side to an image side:

a first lens element with negative refractive power having a concave image-side surface;

a second lens element with positive refractive power having a convex object-side surface and a convex image-side surface; and a third lens element with negative refractive power having a concave image-side surface, the object-side and image-side surfaces thereof being aspheric;

wherein the photographing optical lens assembly further comprises an aperture stop, disposed between the first lens element and the second lens element, and an electronic sensor, disposed at the image plane for image formation, and there are only three lens elements with refractive power in the photographing optical lens assembly; wherein an Abbe number of the second lens element is V2, an Abbe number of the third lens element is V3, a radius of curvature on the object-side surface of the second lens element is R3, a radius of curvature on the image-side surface of the second lens element is R4, a distance on the optical axis between the image-side surface of the third lens element and the electronic sensor is Bf, a distance on the optical axis between the object-side surface of the first lens element and the electronic sensor is TTL, a radius of curvature of the object-side surface of the first lens element is R1, a radius of curvature of the image-side surface of the first lens element is R2, and they satisfy the relations:

$25.0 < V2-V3 < 45.0;$ $-3.5 < R3/R4 < -0.5;$ $0.1 < Bf/TTL < 0.5;$ $0.0 < R2/R1 < 0.3.$

2. The photographing optical lens assembly according to claim 1, wherein the object-side surface of the first lens element is convex, and the third lens element is made of plastic.

3. The photographing optical lens assembly according to claim 2, wherein a focal length of the photographing optical lens assembly is f, a focal length of the second lens element is f2, and they satisfy the relation:

$9 < f/f2 < 1.8.$

4. The photographing optical lens assembly according to claim 3, wherein a focal length of the photographing optical lens assembly is f, a focal length of the second lens element is f2, and they satisfy the relation:

$1.0 < f/f2 < 1.3.$

5. The photographing optical lens assembly according to claim 3, wherein the Abbe number of the second lens element is V2, the Abbe number of the third lens element is V3, and they satisfy the relation:

$31.0 < V2 - V3 < 38.0.$

6. The photographing optical lens assembly according to claim 3, wherein the distance on the optical axis between the image-side surface of the third lens element and the electronic sensor is Bf, the distance on the optical axis between the object-side surface of the first lens element and the electronic sensor is TTL, and they satisfy the relation:

$15 < Bf/TTL < 0.35.$

7. The photographing optical lens assembly according to claim 3, wherein the object-side surface of the third lens element is convex.

8. The photographing optical lens assembly according to claim 7, wherein the focal length of the second lens element is f2, a focal length of the third lens element is f3, and they satisfy the relation:

$-0.95 < f2/f3 < -0.30.$

9. The photographing optical lens assembly according to claim 1, wherein the focal length of the photographing optical lens assembly is f, a distance on the optical axis between the first lens element and the second lens element is T12, and they satisfy the relation:

$0.5 < T12/f < 2.1.$

10. The photographing optical lens assembly according to claim 9, wherein the radius of curvature on the object-side surface of the second lens element is R3, the radius of curvature on the image-side surface of the second lens element is R4, and they satisfy the relation:

$-2.0 < R3/R4 < -1.0.$

11. The photographing optical lens assembly according to claim 1, wherein the distance on the optical axis between the object-side surface of the first lens element and the electronic sensor is TTL, half of the diagonal length of the effective pixel area of the electronic sensor is ImgH, and they satisfy the relation:

$TTL/ImgH < 4.1.$

12. A photographing optical lens assembly comprising, in order from an object side to an image side:
  a first lens element with negative refractive power having a convex object-side surface and a concave image-side surface;
  a second lens element with positive refractive power having a convex image-side surface, at least one of the object-side and image-side surfaces thereof being aspheric; and
  a third lens element with negative refractive power, the object-side and image-side surfaces thereof being aspheric;
  wherein the photographing optical lens assembly further comprises an aperture stop, disposed between the first lens element and the third lens element, and an electronic sensor, disposed at the image plane for image formation;
  wherein there are only three lens elements with refractive power in the photographing optical lens assembly, a focal length of the photographing optical lens assembly is f, a focal length of the second lens element is f2, a focal length of the third lens element is f3, a distance on the optical axis between the first lens element and the second lens element is T12, and they satisfy the relations $0.5 < T12/f < 2.1;$ $-0.95 < f2/f3 < -0.30.$ 13. The photographing optical lens assembly according to claim 12, wherein the third lens element has a concave image-side surface and is made of plastic.

14. The photographing optical lens assembly according to claim 13, wherein the focal length of the photographing optical lens assembly is f, the focal length of the second lens element is f2, and they satisfy the relation:

$0.9 < f/f2 < 1.8.$

15. The photographing optical lens assembly according to claim 14, wherein the focal length of the photographing optical lens assembly is f, the distance on the optical axis between the first lens element and the second lens element is T12, and they satisfy the relation:

$0.8 < T12/f < 1.8.$

16. The photographing optical lens assembly according to claim 12, wherein the focal length of the photographing optical lens assembly is f, the focal length of the second lens element is f2, and they satisfy the relation:

$1.0 < f/f2 < 1.3.$

17. The photographing optical lens assembly according to claim 12, wherein a distance on the optical axis between the object-side surface of the first lens element and the electronic sensor is TTL, a distance on the optical axis between the image-side surface of the third lens element and the electronic sensor is Bf, and they satisfy the relation:

$1 < Bf/TTL < 0.5.$

18. The photographing optical lens assembly according to claim 17, wherein an Abbe number of the second lens element is V2, an Abbe number of the third lens element is V3, and they satisfy the relation:

$31.0 < V2 - V3 < 38.0.$

19. The photographing optical lens assembly according to claim 12, wherein the third lens element has a convex object-side surface and at least one inflection point on the image-side surface.

20. The photographing optical lens assembly according to claim 19, wherein a radius of curvature on the object-side surface of the second lens element is R3, a radius of curvature on the image-side surface of the second lens element is R4, and they satisfy the relation:

$-2.0 < R3/R4 < -1.0.$

* * * * *